Feb. 27, 1973 R. L. PITMAN ET AL 3,718,092
BATTERYLESS ELECTRONIC TIME FUSE
Filed Jan. 11, 1971
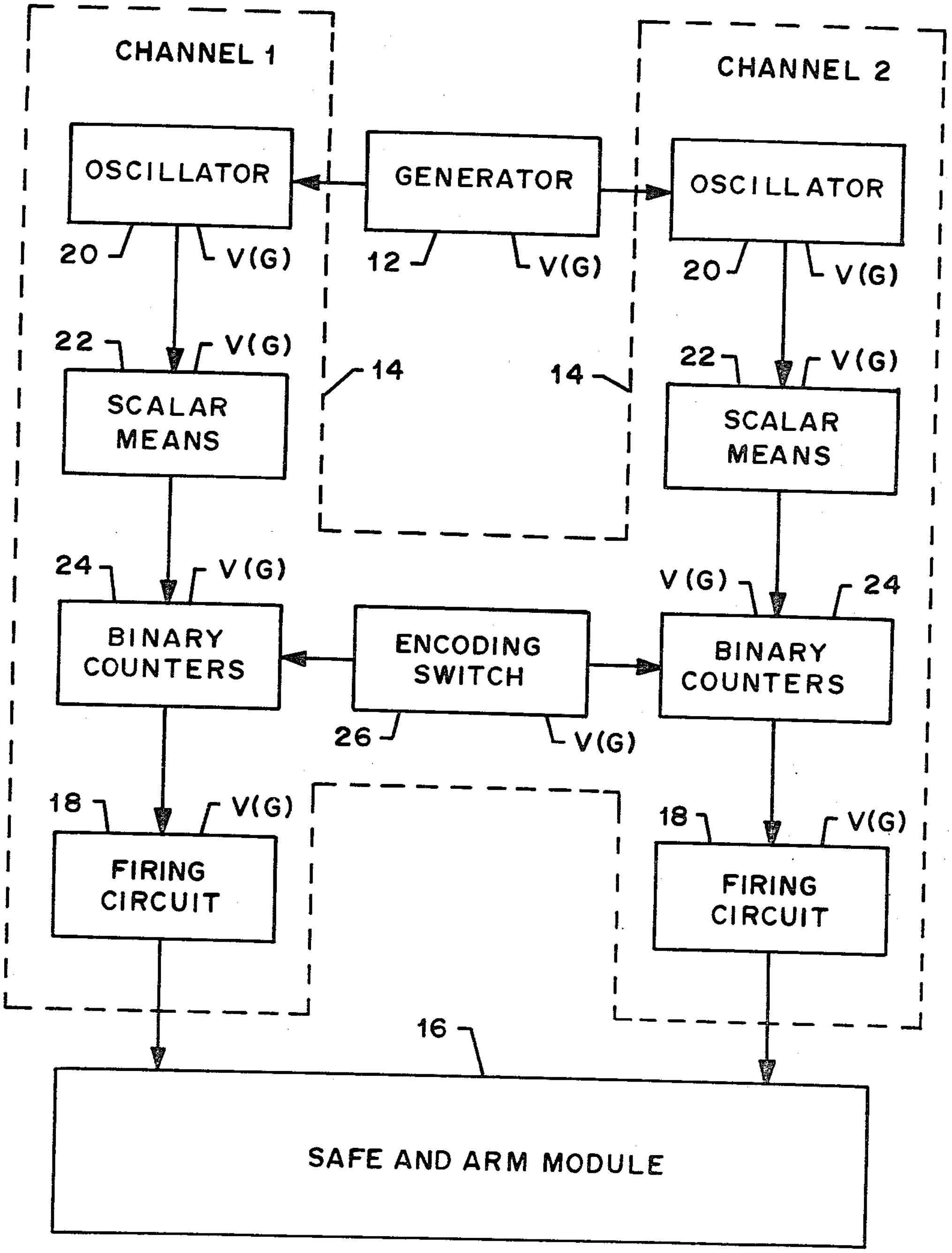
H.T. RAND
P.WELDON
J.H. LYON INVENTORS
R.L. PITMAN
BY: R.H. HAVESON
Harry M. Saragovitz,
Edward J. Kelly &
Herbert Berl Attorneys 3,718,092
Patented Feb. 27, 1973

3,718,092

BATTERYLESS ELECTRONIC TIME FUZE

Robert L. Pitman, Wayne, Robert H. Haveson, Flanders, Jerry Lyon, Stanhope, Peter Weldon, Flanders, and Henry T. Rand, Denville, N.J., assignors to the United States of America as represented by the Secretary of the Army Filed Jan. 11, 1971, Ser. No. 105,464
Int. Cl. F42c *11/02, 15/04, 15/40*
U.S. Cl. 102—70.2 R 15 Claims

ABSTRACT OF THE DISCLOSURE

A batteryless electronic time fuze particularly suitable to use in an artillery projectile wherein the fuze comprises in combination: a lightweight pulse-producing generator, the generator producing a pulse at the moment of firing of the projectile; a digital timing network, the timing network energized by, and electronically connected to, the generator; and a safe and arm mechanism, this mechanism also energized by the generator and electrically connected to, and activated at a predetermined time by, said timing network.

The invention described herein may be manufactured, used and licensed by the Government for governmental purposes without payment to us of any royalty thereon.

BACKGROUND OF THE INVENTION

The present invention relates to the field of art dealing with electronic time fuzes for artillery projectiles.

Prior art electronic fuzing has utilized, in one form or another, a battery as its power source. With the use of batteries has followed all the concomitant problems of storage life, temperature sensitivity, durability and, hence, reliability. The present invention eliminates these problems through the use of a pulse-producing generator which may be of either a magnetic or a piezoelectric type.

Upon firing of the projectile, the generator produces a pulse which, through capacitor means, energizes the entire fuze system. In other words, a portion of the kinetic energy developed by the firing of the munition is converted into electrical energy via a magnetic or piezoelectric transformation, depending on which type of generator is used.

Such generators produce power levels of less than .5 milliwatt. These power levels are not sufficiently high to operate conventional solid state circuitry, in particular, the type of solid state oscillator which is an essential subsystem of any miniaturized electronic time fuze. However, comparatively recent developments in the area of solid state physics have made possible the construction of an oscillator which can operate at .5 milliwatt, and even as low as .05 milliwatt. This type of oscillator is known as an LC field effect transistor oscillator, which did not appear in the literature until the late 1960's. See Electronics: BJT's, FETS, and Microcircuits (McGraw-Hill, 1969) by E. James Angelo, Jr.

Also the high impedance ($10^{14}$ ohms) of the field effect transistor made it possible to construct an oscillator whose power needs would not exceed the capability of a magnetic or piezoelectric generator. The recognition of this fact by the inventors contributed to the conception of the present invention.

Also, our invention presents the first instance in which a digital timing network has been used in an artillery fuze to activate a Safe and Arm device. The mechanical aspects of the Safe and Arm device employed in the present invention are an equivalent of the type illustrated in U.S. Pat. No. 2,872,868 (FIG. 2), W. J. Donahue, Jr. et al.

SUMMARY OF THE INVENTION

The primary object of this invention is to provide an electronic fuze for artillery projectiles which does not require a stored source energy for energizing the timing system.

Another object of this invention is to provide an electronic time fuze which is insensitive to the changes of temperature which occur in an artillery environment.

A further object is to provide an artillery fuze which will arm at a predetermined period of time following setback and will actuate at a given instant following arming, hence, reducing the danger of troop injury by either a premature arming or an overshoot accident.

An additional object is to provide an extremely accurate and reliable artillery time fuze.

The present novel batteryless electronic time fuze comprises in combination: a lightweight pulse-producing generator, the generator producing a pulse at the moment of firing of the projectile; a digital timing network, the timing network energized by, and electronically connected to, the generator; and a safe and arm mechanism, this mechanism also energized by the generator and electrically connected to, and activated at a predetermined time by, said timing network.

THE DRAWING

The invention and a fuller understanding of its nature and objects will appear more clearly from the following detailed description taken in conjunction with the accompanying drawing, showing by way of example the preferred embodiments of the inventive concept. The drawing is a block diagram of the novel fuze system.

DESCRIPTION OF THE PREFERRED EMBODIMENTS

The present novel batteryless electronic time fuze is particularly suitable to use in an artillery projectile.

The invention comprises a lightweight (e.g. 300 grams) pulse-producing generator 12 which generates an electrical pulse at the instant of firing of the projectile. The resultant pulse gives rise to a voltage, V(G), which energizes, through capacitor means, the other fuze subsystems. The drawing denotes each of said capacitor means by the letters V(G). A connection between each V(G) and the generator 12 is understood.

The generator may be of either a magnetic or piezoelectric type. Magnetic generators are of two classes: magnetic setback generators and magnetic spin generators. Examples of the use and design of miniature magnetic generators may be found in U.S. Pat. Nos. 1,711,693 (Ruhlemann) and 2,966,857 (Toomey).

The generator is electrically connected to a digital timing network 14 that may be constructed to exhibit any number of channels, depending on the degree of reliability which is desired. The drawing, in the interest of clarity, illustrates a two-channel system. However, it is anticipated that at least three channels would normally be employed. A third channel, in addition to increasing reliability, also increases the safety of the system, i.e., two of the three channels must operate in order to fire the detonators within a Safe and Arm module 16. As a further safety measure, the Safe and Arm module 16 requires both spin and setback as preconditions to arming. Also, a firing circuit 18 keeps the initiator in the Safe and Arm module 16 out of the line of the detonator until the firing signal is received.

The digital timing network 14 comprises an oscillator 20, said oscillator being connected to scalar means 22. Said scalar means serve the function of reducing the frequency of the oscillator input from about 20 kHz. to an output of about 30 Hz. This lower frequency is more suitable for use by binary counters 24 to which the outputs of said scalar means 22 are connected. The binary counters lead into the firing circuit 18 which finally leads the entire timing network 14 into the Safe and Arm module 16. See drawing. Also included in the timing network 14 is an encoding binary position switch 26. This switch 26 is electrically connected to the binary counters 24. The switch 26 serves as a setting mechanism, i.e., through the use of pin encoder techniques externally supplied ballistic information is converted into binary form and fed into the binary counters 24 to produce the setting logic in the initially unset counters 24.

The process involves the rotation of the ojive or nose of the fuze. This physical rotation enables the encoding switch 26 to set the binary counters 24 to the proper combination of "one's" (generator voltage, V(G)) and "zero's" (ground voltage) that is needed to obtain detonation at the proper trajectory point.

The oscillator 20 utilizes solid state circuitry, preferably complementary field effect transistor circuitry in combination with a temperature compensated LC tank circuit. The oscillator is electrically connected to and energized by the generator 12. The extremely high impedance ($10^{14}$ ohms) of the FET oscillator makes for an excellent impedance match with the generator. Also the low power requirements of the oscillator 20 make it an ideal subsystem to run off a setback or spin generator with its low power characteristic.

Other advantages of this type of oscillator include: voltage insensitivity shock and spin insensitivity, quick start-ups, square wave output (rise time less than 10 microseconds), and simplicity and ease of production.

In military applications a frequency of about 20 kHz. will strike a good compromise between small component size and minimum frequency division. This frequency can be achieved in a Hartley configuration by selecting a capacitor of about 1900 picofarads and an inductor of about 30 millihenries, with the inductor center-tepped by about a 40K ohm resistor. The capacitor and inductor should be chosen with respectively off-setting reactance versus temperature characteristics so as to attain a temperature compensated circuit.

Scalar means 22 utilize a series of binaries to divide the oscillator frequency down to the frequency required for counting by the binary counters 24, i.e., about 30 Hz.

In a three-channel system, there are three electrically operated pins which hold a stab detonator off center until any two of the three counters overflow, thus firing explosive pin removal actuators. At this point spin still exists and the detonator rotates into line against a firing pin causing activation at the desired predetermined instant.

It is thus seen that the objects set forth above are among those made apparent from, and efficiently attained by, the preceding description.

We wish it to be understood that we do not desire to be limited to the exact detail of construction shown and described for obvious modification will occur to persons skilled in the art.

What we claim and desire to be secured by Letter Patent of the United States is:

1. A batteryless electronic time fuze particularly suitable to use in an artillery projectile wherein said fuze comprises in combination:

a lightweight pulse-producing magnetic setback generator producing a pulse at the moment of firing of the projectile;

a digital timing network, being energized by, and electrically connected to, said pulse-producing generator; and a safe and arm mechanism also being energized by said generator and electrically connected to, and actuated at a predetermined time by, said timing network.

2. A batteryless electronic time fuze according to claim 1 wherein said magnetic generator is a magnetic spin generator.

3. A batteryless electronic time fuze according to claim 1 wherein said pulse-producing generator is a piezoelectric generator.

4. A batteryless electronic time fuze according to claim 1 wherein said digital timing network comprises:

a solid state oscillator;

a plurality of binary counters, said counters being electrically connected to said oscillator by scalar means; and a binary position switch, said switch being electrically connected to said binary counters, wherein said switch encodes externally supplied ballistic information into binary form and transmits it to said binary counters.

5. A batteryless electronic time fuze according to claim 4 wherein said solid state oscillator comprises a temperature compensated LC tank circuit in combination with field effect transitor circuitry, said circuitry being suitably chosen to support oscillation-mode gain.

6. A batteryless electronic time fuze particularly suitable to use in an artillery projectile wherein said fuze comprises in combination:

a lightweight pulse-producing generator, said generator producing a charge at the moment of firing of the projectile;

a solid state oscillator, said oscillator being electrically connected to, and capacitatively energized by, said generator;

a plurality of binary counters, said counters being electrically connected to said oscillator by scalar means, and also capacitatively energized by said generator;

a binary position switch, said switch being energized by said generator, said switch being electrically connected to said binary counters, wherein said switch encodes externally supplied ballistic information into binary form and transmits it to said binary counters; and a safe and arm mechanism, said mechanism being energized by said generator, and electrically connected to, and actuated at a predetermined time by, said binary counters.

7. A batteryless electronic time fuze according to claim 6 wherein said pulse-producing generator is a magnetic generator.

8. A batteryless electronic time fuze according to claim 7 wherein said magnetic generator is a magnetic setback generator.

9. A batteryless electronic time fuze according to claim 7 wherein said magnetic generator is a magnetic spin generator.

10. A batteryless electronic time fuze according to claim 6 wherein said pulse-producing generator is a piezoelectric generator.

11. A batteryless electronic time fuze particularly suitable to use in an artillery projectile wherein said fuze comprises in combination:

a lightweight pulse-producing generator, said generator producing a charge at the moment of firing of the projectile;

an LC field effect transistor oscillator, said oscillator being electrically connected to, and capacitatively energized by, said generator;

a plurality of binary counters, said counters being electrically connected to said oscillator by scalar means, and also capacitatively energized by said generator;

a binary position switch, said switch being capacitatively energized by said generator, said switch being electrically connected to said binary counters, wherein said switch encodes externally supplied ballistic information into binary form and transmits it to said binary counters; and a safe and arm mechanism, said mechanism being capacitatively energized by said generator, and electrically connected to, and actuated at a predetermined time by, said binary counters.

12. A batteryless electronic fuze according to claim 11 wherein said magnetic generator is a magnetic setback generator.

13. A batteryless electronic fuze according to claim 11 wherein said magnetic generator is a magnetic spin generator.

14. A batteryless electronic fuze according to claim 11 wherein said pulse-producing generator is a piezoelectric generator.

15. A batteryless electronic time fuze according to claim 11 wherein said LC field effect transistor oscillator utilizes complementary (PNP–NPN) metal-oxide semiconductor circuitry.

References Cited

UNITED STATES PATENTS

| | | | |
|---|---|---|---|
| 3,353,486 | 11/1967 | Haiken | 102—70.2 GA |
| 2,984,111 | 5/1961 | Kritz | 310—8.4 |
| 2,891,479 | 6/1959 | Alexander et al. | 310—8.4 |
| 3,140,662 | 7/1964 | Zaugg | 102—70.2 G |

BENJAMIN A. BORCHELT, Primary Examiner

T. H. WEBB, Assistant Examiner